Patented Feb. 9, 1932

1,844,389

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

PURIFICATION OF ANTHRAQUINONE

No Drawing. Application filed August 15, 1928. Serial No. 299,877.

This invention relates to the purification of impure anthraquinone, and more particularly to the purification of impure anthraquinone by catalytic processes.

Anthraquinone, produced either by the catalytic vapor phase oxidation of anthracene, especially impure anthracene, such as crude anthracene, or by chemical oxidation of anthracene, containing numerous impurities which render it unsuitable for the production of dye stuffs and intermediates, some of the impurities, even when present in relatively small quantities, seriously affecting the shade of dyes produced. For this reason it has not been feasible in the past to oxidize crude or semi-purified anthracene by catalytic processes, nor has it been feasible to subject anthracene which is not highly purified to various forms of chemical oxidations, because the cost of removing the undesirable impurities from the crude anthraquinone has been excessive, and in some cases no satisfactory processes have been available. It has therefore been necessary to use relatively highly purified anthracene as a raw material for the production of anthraquinone, thus greatly increasing the cost of the anthraquinone, because most of the processes for purifying crude anthracene are relatively expensive.

The present process purifies crude anthraquinone of various grades with high efficiency, and results in a product of the highest purity which can be directly used without further purification in the manufacture of dye stuffs, and permits the production of products of remarkably fine shades. According to the present invention impure anthraquinone is subjected to a vapor phase catalytic oxidation in the presence of contact masses which do not tend to oxidize anthraquinone. It is possible by the present invention to completely burn out the impurities present in the crude anthraquinone, or in some cases to transform them into products which are harmless. The loss of anthraquinone is small, or in many cases nil, and it is thus possible by the present invention to transform crude anthraquinone into anthraquinone of the highest purity in a process which is cheap in its operating cost, and which gives most excellent yields of high quality product.

Two main classes of contact masses can be used in the present invention; firstly contact masses which are capable of oxidizing the impurities present, usually transforming them by total combustion into carbon dioxide and water, or fixed gases without having any considerable oxidizing effect on anthracene. These contact masses are known as anthracene purification contact masses, and are described in my co-pending application, Serial No. 228,977, filed October 26, 1927, and any of the contact masses there described may be used in the present invention. Most of these contact masses, or more properly most of the preferred contact masses of this class, contain stabilizers; that is to say, non-catalytic compounds of the alkali metals, alkaline earth metals, and strongly basic earth metals. The contact masses may also contain catalytically active components, which, however, are not specific oxidation catalysts, and which are designated in the above referred to application as stabilizer promoters. It should be understood that in the present application the terms "stabilizers" and "stabilizer promoters" are used in the same sense and in no other. Anthracene purification catalysts are the most efficient where the crude anthraquinone does not contain unoxidized anthacene, but where it may contain oily materials, phenanthrene derivatives, carbazole and other impurities which are present in crude anthracene and which are not completely removed in the oxidation to crude anthraquinone. The anthracene purification catalysts have substantially no oxidizing effect on anthraquinone under the reaction conditions described in my prior application above referred to. They are therefore highly efficient in the process of the present invention, as they purify anthracene free, crude anthraquinone with a minimum of loss of anthraquinone or in some cases with substantially no loss at all.

Where the crude anthraquinone contains small amounts of anthracene it is normally not satisfactory to use an anthracene purification catalyst or contact mass, and in such cases a specific anthraquinone catalyst; that is to say, one which specifically catalyzes the oxidation of anthracene to anthraquinone, should be used, but the catalyst should be of a type which does not seriously oxidize anthraquinone itself. Any such anthraquinone catalyst may be used in the present invention, but I have found that stabilized catalysts, such as those described in my co-pending application, Serial No. 196,393, filed June 3, 1927, now Patent No. 1,709,583, dated April 23, 1929, are particularly effective, since they show good powers of oxidation for anthracene, and of destruction of impurities, while at the same time showing very low and in some cases no tendency to oxidize anthraquinone. Highly effective contact masses particularly of the stabilized type, are those in which base exchange bodies are contained, either non-silicious base exchange bodies or zeolites. Such contact masses are described in my co-pending applications, Patent No. 1,694,122, dated December 4, 1928, Patent No. 1,735,763, dated November 12, 1929, and Patent No. 1,722,297, dated July 30, 1929, and any such base exchange contact masses which are suitable for the oxidation of anthracene may be used. Contact masses containing leached base exchange bodies suitable for the oxidation of anthracene to anthraquinone are also highly effective for use in the present invention. Such contact masses are described in my co-pending application Serial No. 294,597, filed July 21, 1928, and any of these contact masses which are suitable for the oxidation of anthracene may be used in the present invention. Contact masses containing base exchange bodies and suitable for the purification of anthracene are also extensively described in the anthracene purification application referred to above, and form some of the most effective contact masses.

While it is normally desirable to use anthracene purification catalysts or contact masses where the crude anthraquinone does not contain anthracene, it should be understood that such crude anthraquinones as well as anthraquinones containing small amounts of anthracene may be purified by the use of anthraquinone catalysts, and it should be understood that such crude anthraquinones as well as anthraquinones containing small amounts of anthracene may be purified by the use of anthraquinone catalysts, and such processes are of course included within the scope of the present invention. Of course contact masses containing both anthracene purification and anthraquinone catalysts may be used.

It should be understood that the most effective anthracene purification contact masses and many of the highly effective anthraquinone catalysts or contact masses are alkaline; that is to say, contain an excess of alkaline as opposed to neutral or acid stabilizers. For the present invention I prefer to use contact masses having an alkaline reaction, as many of the impurities present in the crude anthraquinone are relatively easily decomposed in the presence of an alkaline contact mass. This is particularly true of heterocyclic compounds which may be present and the alkaline contact masses also serve to decompose impurities of an organic acid character. While alkaline contact masses of either the anthracene purification or anthracene oxidation type may be considered as the preferred ones for the present invention, it is possible to use non-alkaline contact masses, and with many crude anthraquinones, especially those which do not contain relatively large amounts of impurities which are easily decomposed in the presence of alkaline contact masses, non-alkaline catalysts give excellent results, and are of course included within the broad scope of the present invention.

The reaction conditions under which the present invention is carried out will of course vary to a certain extent with the nature of the contact mass and with the chemical composition of the crude anthraquinone. In general the reaction conditions when using an anthracene purification catalyst are the same as when crude anthracenes are purified with the same contact mass; that is to say, it is normally advantageous to operate with an excess of air, and to maintain such moderate temperatures as are described in detail in the examples in my prior application, Serial No. 228,977, filed October 26, 1927. Similarly when purifying crude anthraquinone with an anthraquinone catalyst, especially when the crude anthraquinone contains small amounts of anthracene as one of its impurities, the reaction conditions should be chosen similar to those for oxidizing high grade anthracene with the same contact mass, and the reaction conditions described in my prior applications above referred to may be effectively used in the process of the present invention.

It should be noted that the present invention puts crude anthraquinone on the same economic level as purified anthracene; that is to say, both of these products can be transformed into high grade anthraquinone with good yields by a single vapor phase catalytic oxidation. This standpoint should be borne in mind in considering the relative efficiency of oxidizing crude anthracenes to crude anthraquinones which are then purified by the present invention, and purifying the crude anthracene, for example, in accordance with my prior application, Serial No. 228,977, above referred to, or by effective solvent methods, for example, such as described in my prior application, Patent No. 1,693,713, dated December 4, 1928, and then oxidizing this purified anthracene to high grade anthraquinone in a single step, as described in some of the prior applications above referred to. The present invention, which makes it unnecessary to purify anthracene, is especially effective where anthracenes are available which are too crude to satisfactorily purify in a single step before oxidation.

The present invention may be carried out by vaporizing crude anthraquinone, preferably uniformly with an oxygen containing gas and passing it over the catalysts above referred to, or crude anthracene may be oxidized catalytically to crude anthraquinone, and the product, if necessary without separation from the converter exhaust gases, may be then further purified by the present invention. In some cases it is even desirable to have the reaction gas containing the vaporized crude anthracene pass in series, first through a contact mass which produces crude anthraquinone and then through a contact mass capable of purifying the crude anthraquinone in accordance with the present invention. I prefer in most cases to carry out the process in two steps as the reaction conditions, such as amount of oxygen, temperatures and the like, are not necessarily the same for the oxidation of crude anthracene to crude anthraquinone and for the purification of crude anthraquinone and by carrying out the process in two separate steps, each step may be carried out under the reaction conditions best fitted for optimum results in the particular step. A further advantage of carrying out the production of high grade anthraquinone from crude anthracene in a two step process lies in the fact that the exotherm resulting from the combustion of impurities and from the oxidation of anthracene to anthraquinone is usually very different in the two steps, and frequently a converter design or reaction conditions which best take care of the exotherm in one step may not be best suited for the conditions of exotherm in the other step. However, the present invention also includes combination processes in which crude anthracene of various grades of purity is oxidized in a single process, to high grade anthraquinone as described above. In this connection it should be noted that throughout the present specification anthracenes which are not sufficiently pure to be oxidized directly to high grade anthraquinone even with the best stabilized anthraquinone contact masses in a single step will be considered as crude anthracenes, although the degree of crudity and percentage of anthracene may vary within wide limits.

While it is an advantage of the present invention that it is possible to oxidize crude anthraquinones, even anthraquinones containing large amounts of impurities directly to high grade anthraquinone in a single step, it is sometimes desirable to submit the crude anthraquinone to a preliminary purification, for example, by treatment with solvents, either such as pyridine, or even more effective furane solvents, such as furfural, or solvents which dissolve out phenanthrene but do not remove most of the carbazole, such as hydrocarbons of the benzene series, gasoline, acetone, alcohol, chlorinated solvents, such as orthodichlorbenzene, chlorinated residues from the chlorine purification of light oils, etc. Such a preliminary solvent treatment is sometimes desirable, especially where the anthraquinone is very crude, as it reduces the amount of impurities to be burned out in a subsequent catalytic oxidation, which correspondingly decreases the exotherm, and particularly where an anthraquinone catalyst is used, decreases losses of anthraquinone. Thus for example, crude anthraquinone containing anthracene as well as other impurities may be subjected to a solvent treatment with furfural, resulting in an anthraquinone which contains anthracene as its main impurity. Such an anthraquinone can be very efficiently purified to high grade anthraquinone using a well toned anthraquinone catalyst. Such combined purifications are included within the scope of the present invention.

The invention will be described in greater detail in connection with the following specific examples, which, however, in no sense limit the invention to the particular details therein set forth.

Example 1

Dark brown oily anthraquinone obtained by the catalytic oxidation of 29–35% crude anthracene with a vanadium catalyst, and containing about 78.2% anthraquinone, substantially no unoxidized anthracene, 4–6% carbazole, some phenanthrene, traces of phenanthraquinone, acid impurities such as phthalic anhydride, benzoic acid, maleic acid, etc., can be purified by vaporizing uniformly into air in the proportion of about 1:35–50 parts of air and then passing at 380–400° C. over a contact mass which is prepared by intimately mixing 8.7 parts of $Fe_2O_3$ with 87 parts of $TiO_2$ in a mortar, suspending the mixture in 140 parts of water, adding 8 parts of 100% KOH in the form of a 10 N KOH solution, and then spraying onto 200 volumes of pea sized pumice fragments which are agitated and heated sufficiently to instantaneously vaporize the water from the suspension as it is sprayed onto them. Preferably the reaction is carried out in a converter provided with excellent temperature control, such as a tubular converter using a boiling metal alloy bath, for example, alloys of mercury and cadmium, mercury and lead, and the like, the bath boiling at or a little below the reaction temperature desired. The loading may be from 3–5 grams of crude anthraquinone per hour per 77–100 c. c. of catalyst. Practically chemically pure anthraquinone is obtained in an excellent yield.

The contact mass above described is a so called anthracene purification catalyst which does not oxidize anthracene. Other similar contact masses may be used with crude anthraquinones of the above type, for example, 18 parts of $Fe_2O_3$ may be added to a solution of 25 parts of $KNO_3$ in 150 volumes of water and then sprayed onto 200 volumes of pea sized pumice fragments or other carriers, such as roughened quartz, silicates, minerals, aluminum granules, artificial carriers, formed, for example, from kieselguhr and water glass or kieselguhr and alkalies, such as potassium or sodium hydroxides, carbonates or cyanides. The spraying should be carried out as described above. Other effective contact masses may be prepared containing cobalt oxide, copper oxide, nickel oxide, cerium oxide, titanium oxide, zirconium oxide, and the like, singly or in admixtures. Alkaline stabilizers, such as hydroxides, nitrates, cyanides, etc., of potassium are particularly effective. Any of the other anthracene purification contact masses described in my application, Serial No. 228,977, above referred to, may be used.

*Example 2*

Crude anthraquinone of various grades produced by the oxidation of various grades of crude anthracene with vanadium catalysts are washed with furfural or with phenanthrene solvents, such as benzol, toluol, solvent naphtha, acetone, gasoline, chlorbenzene, orthodichlorbenzene, or other chlorinated hydrocarbons, such as for example, residues from the chlorine purification of light oils. Starting with a crude anthraquinone containing from 74 to 80% of anthraquinone, a semi-purified anthraquinone of from 92 to 94% purity is obtained. The treatment may be by recrystallization or by leaching, and the semi-purified anthraquinone can be effectively purified in the presence of an anthracene purification catalyst prepared as follows:

18 parts of copper oxide prepared by precipitating a solution of copper nitrate of a strength corresponding to 17 parts of copper nitrate with 6 mols of water in 200 volumes of water, a 10% solution of KOH being used. The precipitate caused is filtered and then suspended in 250 volumes of water to which are added 8 to 10 parts by weight of 100% KOH, or a corresponding amount of $KNO_3$ or KCN. The suspension is then sprayed onto 200 volumes of pea sized pumice fragments, and the contact mass produced is calcined in a stream of air at 350-400° C. The semi-purified anthraquinone described above is uniformly vaporized with air in the proportion of 1:25-35 parts by weight, and is passed over the contact mass at 350-400° C. An anthraquinone is obtained which is actually chemically pure. The loadings may be 4-5 grams of semi-purified anthraquinone per 77-100 c. c. of catalyst per hour. The exotherm evolved is not great, and converters using automatic reaction gas cooling, that is to say, a reaction gas cooling which increases in proportion to the increase in velocity of the reaction gases through the converter, may be used with excellent results. These converters are much cheaper than the bath type.

A semi-purified anthraquinone may also be obtained by washing 100 parts of oily tailings from the catalytic production of anthraquinone from crude anthracene with 200 parts of a 10% NaOH solution, in order to remove acid compounds. The crude material contains about 80.36% anthraquinone. The semi-purified anthraquinone obtained can be purified as described above, and yields substantially chemically pure anthraquinone with excellent yields.

*Example 3*

Crude anthraquinone having an anthraquinone content ranging from 68-96% is obtained by the catalytic oxidation of different grades of anthracene. When 28-35% crude anthracene is oxidized the anthraquinone may have a purity of 68-84%, and when semi-refined anthracene such as anthracene prepared by means of the phenanthrene solvents described in the foregoing example, containing 55-68% anthracene is oxidized anthraquinone from 94-96% pure is obtained. Crude anthraquinones of various grades can be produced by oxidizing various grades of anthracene with the following contact mass:—18.2 parts of very pure $V_2O_5$ are dissolved in 200 volumes of a KOH solution containing 22.6 parts of 100% KOH and 18 parts of ferric sulfate, together with 18.8 parts of cobalt sulfate with 7 mols of water are dissolved in 300 parts of hot water. The potassium vanadate solution is then poured into the hot iron-sulfate cobalt sulfate solution with vigorous agitation. A precipitate is obtained which is filtered by suction and washed free from the mother liquor. The cake obtained is then sludged with 35 parts of $K_2SO_4$ in 250 parts of water. 720 parts of 8-10 mesh quartz fragments are boiled in an alkaline potassium aluminate solution prepared by precipitating aluminum hydroxide from a solution of 112 parts of aluminum sulfate with 18 mols of water in 200 parts of water using concentrated ammonia and then dissolving the aluminum hydroxide after it has been filtered and carefully washed in a solution containing 672 parts of 90% KOH together with 300 parts of water. The boiling is continued for three hours, whereupon the product is washed and treated with a hydrochloric acid solution until a methyl red indicator turns. The pretreated quartz which may of course also be substituted by pumice fragments, fragments of quartz filter stones, sand stones, "Celite" bricks, natural or artificial silicates, base exchanging or non-base exchanging, especially zeolites diluted with material rich in silica, metal granules, such as granules of aluminum, of metal alloys such as ferro-silicon, ferrovanadium, ferrochrome and the like, having roughened surfaces. The suspension of iron cobalt vanadate is sprayed on the quartz fragments using heat in agitation, as described in Example 1, and the contact mass obtained is then blown with air at 400° C. for an hour or two.

Nickel, copper, silver, manganese and cerium salts may replace part or all of the iron and cobalt and potassium nitrate, sodium sulfate, sodium nitrate or other alkali or alkaline earth metal compounds may be used.

The contact mass is filled into a tubular converter using a boiling mercury alloy bath such as mercury-lead, containing 80% lead and 20% mercury. The tubes may advantageously have an internal diameter of 2 c. m. and a height of 30–40 c. m. When 35% crude anthracene is uniformly vaporized with air in the proportion of 1:30–40 parts by weight an oily crude anthraquinone of 73–78% purity is obtained with a loading of 5–10 grams of crude anthracene per tube per hour. The impurities are mainly phenanthrene, 2–5% carbazole and no anthracene. Under the same reaction conditions semi-purified anthracene will give a crude anthraquinone of 88–96% purity under a loading of 4–8 grams per tube per hour.

These crude anthraquinones may be purified by using a catalyst prepared as follows:—70 parts of cobalt nitrate with 6 mols of water are dissolved in 200 parts of water, precipitated with a 10 N KOH solution, filtered and suspended in 250 parts of water containing 8 parts of 100% KOH. The suspension is then coated onto 200 volumes of pea sized pumice fragments, as described in the foregoing examples and the contact mass obtained blown with air at 400° C. Thereupon it is filled in a suitable converter, such as for example, a tubular alloy bath converter as described above. Crude anthraquinone of about 74.4% purity prepared as described above, is uniformly vaporized with air in the proportion of 1:15–27 parts by weight and passed over the contact mass at 400–420° C. Anthraquinone of excellent appearance is obtained, which analyzes 99.9% by the Hoechst method. The yields are nearly theoretical, based on the anthraquinone content and loadings of 4–6 grams per tube per hour can be used. Crude anthraquinone as low as 68.5% can be readily purified as described above.

Instead of using two converters, in one of which crude anthracene is oxidized to crude anthraquinone and in the second the crude anthraquinone is purified, a high grade anthraquinone completely satisfactory for use as an intermediate for vat dyes can be prepared by carrying out the two steps described above in two catalyst layers in a single converter, the reaction gases first contacting with the anthraquinone catalyst for the manufacture of crude anthraquinone and then with the anthracene purification catalyst for the purification of the anthraquinone. I prefer to carry out the process in two separate converters, as a higher oxygen content can be assured in the reaction gases for the second step when crude anthraquinone is vaporized with fresh air.

*Example 4*

Crude anthraquinone, prepared as described in Example 3, can be purified by means of an anthraquinone catalyst. This is especially effective where the crude anthraquinone may contain some unchanged anthracene. If desired crude anthraquinone may be given a preliminary purification by washing, leaching or recrystallizing from solvents, such as furfural or phenanthrene solvents, as described in the foregoing examples. An anthraquinone contact mass suitable for this purpose is prepared with the following mixtures:

(1) 200 parts of a 33° Bé. potassium water glass solution diluted with 6–8 volumes of water are mixed with a mixture of comminuted silicates and kieselguhr until the suspension remains easily stirrable. The mixed diluents should preferably contain more than 25% of kieselguhr but the relative proportions may vary within wide limits.

(2) 18 parts of $V_2O_5$ are reduced in a hot aqueous solution, acidified with $H_2SO_4$, by means of sulfur dioxide, a solution of blue vanadyl sulfate being obtained. The vanadyl sulfate is transformed into a brown solution of potassium vanadite, using just sufficient 10 N caustic potash solution.

(3) A 5–10% manganous sulfate solution is prepared. Suspension (1) and solution (2) are poured together, and sufficient manganous sulfate solution is added in a thin stream with vigorous agitation until the reaction mixture is neutral to phenolphthalein or just alkaline. The mass solidifies to a dirty gel, which is filtered with suction, slightly washed and dried, and constitutes a diluted zeolite containing tetravalent vanadium and manganese in non-exchangeable form. Instead of suspending the diluents in solution (1) they may be suspended in solution (2), or solutions (1) and (2) may be mixed and the diluents suspended in the mixture.

Part or all of the potassium vanadite in solution (2) may be substituted by a corresponding amount of potassium vanadate, and part or all of solution (3) can be substituted by other metal salt solutions, such as for example, solutions of copper sulfate, nickel sulfate, cobalt sulfate, iron sulfate or their nitrates. If desirable the zeolites after drying, preferably at 100° C., may be subjected to base exchange after first hydrating by trickling water over the zeolite, or salt like bodies can be prepared by causing the zeolites to react with compounds containing suitable anions which are capable of reacting with the zeolites to form salt like bodies. The diluted zeolite contact mass described above may be used directly as an anthraquinone purification catalyst or may be heated to 420–500° C. and then treated with 3–5% burner gases.

Crude anthraquinone containing 66.28% anthraquinone, 14.34% anthracene and 2.5% carbazole, or a crude anthraquinone containing 69.8% anthraquinone, 8.13% anthracene, and 1.58% carbazole, or finally a crude anthraquinone containing 92.05% anthraquinone, no anthracene and 0.62% carbazole can be vaporized with air in the proportion of 1:30–35 parts by weight and passed over the contact mass at 390–400° C. All of the crude anthraquinones above described yield anthraquinones of excellent appearance, small amounts of phthalic anhydride being encountered in the tailings. The yields based on anthraquinone content range between 80 and 90% of theory.

*Example 5*

144 parts of $V_2O_5$ are suspended in 200 parts of water to form a slurry, and after warming to 60–70° C. are dissolved with 42 volumes of 10 N. KOH. 14.8 parts of manganous sulfate and 2 mols of water are dissolved in 100 parts of water and the solution poured into the potassium vanadate solution with vigorous agitation, followed by warming to 40–50° C. and neutralization to litmus by means of 2 N $H_2SO_4$. The brownish precipitate which forms is filtered, thoroughly washed with water, and suspended in a solution containing 10 parts of potassium bromide in 200 parts of water. The suspension is then sprayed onto 400 volumes of pea sized pumice fragments to produce a uniform coating, as described in the foregoing examples. The stabilized contact mass thus obtained is filled into a converter and vapors crude anthraquinone containing 88–90% anthraquinone, and 1–2% carbazole admixed with air in the proportion of 1:25 by weight are passed over the contact mass at 380–420° C. A high grade anthraquinone is obtained which is very suitable as a dye stuff intermediate and analyzes 99.8% pure by the Hoechst method.

Similar results may be obtained by using the vanadates of iron, cobalt, nickel, titanium, aluminum, copper, silver, lead or other metals instead of manganous vanadate. Other stabilizers such as potassium nitrite, potassium nitrate, potassium cyanide, potassium chloride, potassium fluoride, potassium acid fluoride, potassium sulfate, potassium bisulfate, sodium hydrogen phosphate, potassium hydroxide, sodium carbonate, and the like may be used in various quantities, depending on their efficiency as stabilizers.

Instead of using vanadium other metal elements of the fifth and sixth groups of the periodic system may be used, such as molybdenum, tungsten, etc. Mixtures of two or more metal elements of the fifth and sixth groups may also be used.

*Example 6*

30 kg. of 38° potassium waterglass are diluted with 300 liters of water and mixed with a solution containing 6.75 kg. of ferric chloride in 225 liters of water, the mixture taking place with vigorous agitation. The amount of ferric chloride solution may be varied within wide limits, but the reaction mixture should remain neutral or feebly alkaline to phenolphthalein. The precipitate which forms is separated from the liquid by decantation or filtration and is pressed and dried in the air or at temperatures below 100° C. The product may then be broken into pea sized fragments.

The ferric chloride may be substituted partly or wholly by other iron salts, such as ferric sulfate, ferrous sulfate, ferric nitrate, ferrous acetate, and the like or corresponding salts of copper, cobalt, or nickel.

The contact masses constitute two-component zeolites being the reaction products of two types of components, namely, a soluble silicate and a metal salt. They are excellent contact masses for the purification of crude anthraquinone and, if desired, their catalytic efficiency can be further increased by embedding diluents into the zeolite structure, such as, for example, oxides or other compounds of iron, cobalt, nickel, copper or a plurality of them. $TiO_2$, $ZrO_2$, $ThO_2$, ZnO, and CdO may also be present if desired.

Similar zeolite contact masses are obtained by adding a solution of potassium aluminate to the precipitate with vigorous agitation. The potassium aluminate solution should be prepared by mixing a solution containing 9.9 kg. of crystallized aluminum chloride with a solution of potassium hydroxide until the aluminum hydroxide which at first precipitates has again dissolved. After settling, the undissolved residue is separated from the liquid, pressed and dried at temperatures under 100° C. whereupon it is broken into suitable fragments. Metallates or other amphoteric metal oxides may be substituted for the aluminate. These contact masses, especially when containing cobalt, are well suited for the purification of crude anthraquinone.

Two-component zeolites may also be prepared by causing soluble silicates to react with metallates instead of metal salts or three-component zeolites can be prepared which are the reaction product of soluble silicates with both metallates and metal salts.

Examples of metallates which may be used are potassium aluminate, potassium chromite, sodium plumbite, potassium zincate, and cadmiate. Metal salts of the heavy metals, such as iron, cobalt, nickel, copper, and silver may be used as the metal salt components.

Zeolite contact masses may also be treated with suitable salt solutions to introduce other bases by base exchange. Thus, for example, bases containing the elements iron, cobalt, nickel, copper, chromium, vanadium, lead, thorium or silver may be introduced by trickling the corresponding salt solutions over the hydrated zeolites, the solutions being preferably of 5–10% strength.

The zeolites may also be caused to react with compounds containing anions capable of forming salt-like bodies with the zeolites. Examples of such compounds are those containing anions of the metal acids of the fifth and sixth groups of the periodic system, such as vanadic acid, molybdic acid, tungstic acid, tantalic acid, chromic acid, etc. The nitrate, chloride, sulfate, or phosphate anions may also be used.

Other types of zeolites may be utilized when they contain or are associated with suitable catalytic elements which may be present as part of the complex molecule of the zeolite or may be embedded in the form of diluents in zeolites formed by wet or fusion methods.

Polysilicates, which do not have base exchange power, such as polysilicates of iron, cobalt, nickel, copper, aluminum, chromium, lead, vanadyl silicate, etc. when stabilized with compounds of the alkali or alkaline earth metals, such as $KCN$, $KNO_2$, $KNO_3$, potassium phosphates, $CaO$, $NaCN$ and the like or in the formation of the silicates the reaction mixture may be maintained sufficiently near to neutrality to litmus so that alkali compounds are present.

Another example of the three-component zeolite referred to above is prepared as follows:

3 kg. of crystallized aluminum sulfate are dissolved in 10 liters of water and sufficient 5 N. KOH solution is added until a potassium aluminate solution is obtained, which is then poured into a solution of 20 kg. of 38° Bé. potassium waterglass diluted with 300 liters of water. Thereupon a 10% solution of mixed cobalt and ferric nitrates in the ratio of 3 parts cobalt nitrate to one part ferric nitrate is poured into the aluminate waterglass solution with vigorous agitation until the reaction product remains just alkaline. The gel obtained is freed from the mother liquor in the usual way, dried at room temperature or at temperatures below 100° C. and is then calcined with air at 400–450° C. Other suitable metal elements may be substituted for the aluminum, cobalt and iron. Crude anthraquinone of various grades of purity, for example a crude anthraquinone of 74.4% purity, freed from unoxidized anthracene is uniformly vaporized into an air stream at the ratio of 1 part crude anthraquinone to 30 parts of air and passed over any of the contact masses described in this example at about 380–440° C. An anthraquinone of excellent appearance is obtained and shows a purity of 99.9% by the Hoechst method. Many of the contact masses give almost theoretical yields.

*Example 7*

Very effective contact masses for the purification of crude anthraquinone are obtained by using alkaline reacting contact mass compositions containing one or more metal elements of the fifth and sixth groups of the periodic system, such as vanadium, tantalum, chromium, molybdenum, tungsten, or uranium. Such a contact mass can be prepared as follows:

18.2 parts of very pure $V_2O_5$ are dissolved in 250 parts of a KOH solution containing 22.6 parts of 100% KOH. Thereupon a solution containing 18.8 parts of ferric sulfate and 18.8 parts of copper sulfate with 7 mols of water dissolved in 300 parts of hot water is prepared and the vanadate solution is poured into it before it is cooled, vigorous agitation being maintained throughout the mixture. The precipitate obtained is filtered by suction washed free from the mother liquor and sludged with 15–20 parts of KOH in 250 parts of water. This suspension is then coated onto 500 volumes of pumice fragments from 8 to 12 mesh.

$MoO_3$, $WO_3$ or a mixture may replace part or all of the $V_2O_5$ and one or more salts of nickel, copper, silver, manganese or cerium may replace the iron and copper used. Instead of KOH as a stabilizer, it may be partly or wholly replaced by KCN, NaOH, CaOH or other alkaline compounds containing alkali or alkaline earth metals. Alkali metal metallates, such as potassium aluminate, cadmiate or chromite are also effective stabilizers; in such cases the amphoteric elements, such as aluminum, play the part of stabilizer promoter. Instead of using pumice fragments, other carrier materials may be used, such as fragments of quartz, quartz filter stones, sand stones, "Celite" bricks, fragments of natural or artificial silicates, base exchange bodies especially zeolites diluted with materials rich in silica, metals such as aluminum granules, metal alloys such as ferrosilicon, ferrovanadium, ferrochrome, and the like; preferably the surface of these carrier materials should be roughened or etched.

The crude anthraquinone is purified by means of the above contact mass under reaction conditions described in the foregoing examples.

Example 8

A contact mass is prepared by dissolving 375 parts of aluminum nitrate with 9 mols of water in water to form a 20% solution, which is then transformed into the corresponding potassium aluminate solution using sufficient 10 N. KOH so that a 10% excess remains. A 20% solution of a mixture of ferric nitrate, cobalt nitrate and copper nitrate in the ratio of 2:3:1 is poured into the aluminate solution until the reaction mixture remains neutral or slightly alkaline to phenolphthalein. The resulting precipitate is filtered off and dried and is a non-silicious base exchange body. Diluted non-silicious base exchange bodies can also be prepared by incorporating diluents such as iron ores, cobalt ores, copper ores or inactive diluents such as kieselguhr, "Celite" brick refuse, glaucosil (the acid leached residue of green sand), etc. It is also possible to add to the metallates 3-5% of complex compounds, such as a blue cuprammonium compound obtained by dissolving basic copper carbonate in an ammonia solution. Other metals may be introduced by base exchange or salt-like bodies can be prepared.

Where the crude anthraquinone to be purified does not contain unoxidized anthracene, the contact mass may advantageously be freed from metal elements of the fifth and sixth groups of the periodic system but where the crude anthraquinone contains unoxidized anthracene in smaller or greater amounts, the contact masses used should be anthraquinone contact masses, that is to say should preferably contain metal elements of the fifth and sixth groups of the periodic system with or without other elements. Such contact masses, which favor the oxidation of anthracene to anthraquinone, are described in my co-pending application, Serial No. 211,638 referred to above.

Crude anthraquinones, such as those described in the foregoing examples, are uniformly vaporized in an air stream in the ratio of 1:25 by weight and passed over a non-silicious base exchange contact mass as described above at a temperature of 360–440° C. An anthraquinone of 99.9% purity is obtained with almost theoretical yields, especially when contact masses are used containing iron, cobalt and copper and where the crude anthraquinone does not contain anthracene.

Example 9

A combined contact mass which contains both anthracene purification and anthracene oxidation components may be prepared as follows:

18.2 parts of $V_2O_5$ are dissolved in 250 parts of KOH solution containing 22.6 parts of 100% KOH, forming potassium vanadate. 27 parts of ferric sulfate are dissolved in 300 parts of water as 60° C. and the potassium vanadate solution is then poured in with vigorous agitation. The precipitate obtained is filtered by suction, washed free from the mother liquor with water until the wash water is colorless and then the wet cake is sludged with 250 parts of water and 28 parts of potassium sulfate are dissolved in the suspension. The above component is an anthracene oxidation component and an anthracene purification component is prepared by dissolving 47 parts of cobalt nitrate with six mols of water in 200 parts of water and precipitating the cobalt hydroxide with sufficient 5 N. KOH solution. The precipitate is filtered, washed free from the mother liquor, and suspended in 300 parts of water, to which 8 parts of KOH are added. The two suspensions are poured together, intimately mixed and coated onto 700 volumes of 8–12 mesh pumice fragments as described in some of the foregoing examples. The mass is then blown with air and filled into a converter. Crude anthraquinone of 75–82% purity containing 3–6% carbazole is uniformly vaporized with air in the proportion of 1:35 and passed over the contact mass at 370–420° C. A high grade anthraquinone results which analyzes 99.9% purity by the Hoechst method and is well suited for dyestuff intermediates.

With the contact mass, crude anthraquinone can be purified when it contains more or less unoxidized anthracene. In such a case, not only are the impurities burned to fixed gases but the unoxidized anthracene is transformed to anthraquinone at the same time. Similar results are obtained when the contact mass is varied, for example, by varying the amounts of ferric sulfate used, which can be within fairly wide limits or by replacing part or all of the ferric sulfate with various amounts of other salt solutions, such as solutions of salts or manganese, cobalt, nickel, copper, silver, magnesium, titanium, cerium or a mixture. The amount of $K_2SO_4$ in the suspension may also be varied within wide limits and can be partly or entirely replaced by other stabilizers such as, $KNO_3$, $KNO_2$, or a mixture. The cobalt oxide may be replaced partly or entirely by iron oxide, nickel oxide, copper oxide, silver oxide, or cerium oxide or a mixture, and if desired small amounts of aluminum oxide, titanium oxide, zirconium oxide or a mixture may be added. The amount of KOH used as a stabilizer for the cobalt oxide may be varied within wide limits and may be partly or entirely replaced by other alkaline stabilizers, simple or complex, such as, for example, KCN, $K_2CO_3$, NaOH, $Ca(OH)_2$ and the like. If desired a mixture of alkaline stabilizers may be used.

This application is in part a continuation of my co-pending applications Serial No. 228,977, filed October 26, 1927, Patent No.

1,694,122, dated Dec. 4, 1928, Patent No. 1,709,583, dated April 23, 1929, Patent No. 1,735,763, dated November 12, 1929, Patent No. 1,722,297, dated July 30, 1929, and Serial No. 294,597, filed July 21, 1928.

In the claims the expression "alkali forming metal" is used to cover the alkali metals and the alkaline earth metals and this expression will have no other meaning in the claims.

What is claimed as new is:

1. A method of purifying crude anthraquinone, which comprises subjecting it in the vapor phase and in the presence of an oxygen-containing gas to the action of a contact mass containing a vapor phase oxidation catalyst, damped with an amount of a compound of an alkali forming metal sufficient to bring the activity of the oxidation catalyst below the level at which substantial oxidation of anthraquinone takes place.

2. A method of purifying crude catalytic anthraquinone obtained by the catalytic vapor phase air-oxidation of impure anthracene, which comprises subjecting it in the vapor phase and in the presence of an oxygen-containing gas to the action of a contact mass containing a vapor phase oxidation catalyst, damped with an amount of a compound of an alkali forming metal sufficient to bring the activity of the oxidation catalyst below the level at which substantial oxidation of anthraquinone takes place.

3. A method of purifying crude catalytic anthraquinone obtained by the catalytic vapor phase air-oxidation of crude anthracene, which comprises subjecting it in the vapor phase and in the presence of an oxygen-containing gas to the action of a contact mass containing a vapor phase oxidation catalyst, damped with an amount of a compound of an alkali forming metal sufficient to bring the activity of the oxidation catalyst below the level at which substantial oxidation of anthraquinone takes place.

4. A method of purifying crude anthraquinone, which comprises subjecting it in the vapor phase and in the presence of an oxygen-containing gas to the action of a contact mass containing a vapor phase oxidation catalyst, damped with an amount of a compound of an alkali metal sufficient to bring the activity of the oxidation catalyst below the level at which substantial oxidation of anthraquinone takes place.

5. A method of purifying crude catalytic anthraquinone obtained by the catalytic vapor phase air-oxidation of impure anthracene, which comprises subjecting it in the vapor phase and in the presence of an oxygen-containing gas to the action of a contact mass containing a vapor phase oxidation catalyst, damped with an amount of a compound of an alkali metal sufficient to bring the activity of the oxidation catalyst below the level at which substantial oxidation of anthraquinone takes place.

6. A method of purifying crude catalytic anthraquinone obtained by the catalytic vapor phase air oxidation of crude anthracene, which comprises subjecting it in the vapor phase and in the presence of an oxygen-containing gas to the action of a contact mass containing a vapor phase oxidation catalyst, damped with an amount of a compound of an alkali metal sufficient to bring the activity of the oxidation catalyst below the level at which substantial oxidation of anthraquinone takes place.

7. A method according to claim 4, in which the compound of the alkali metal is strongly alkaline.

8. A method according to claim 5, in which the compound of the alkali metal is strongly alkaline.

9. A method according to claim 6, in which the compound of the alkali metal is strongly alkaline.

10. A method according to claim 1, in which the contact mass contains in addition to the vapor phase oxidation catalyst and the compound of the alkali forming metal at least one catalyst for a vapor phase reaction other than oxidation.

11. A method according to claim 1, in which the contact mass contains vanadium.

12. A method according to claim 2, in which the contact mass contains vanadium.

13. A method according to claim 1, in which the contact mass contains at least one base exchange body.

14. A method of transforming impure anthracene into high-grade anthraquinone, which comprises subjecting the anthracene to vapor phase catalytic oxidation in the presence of a vapor phase oxidation catalyst for anthracene and subjecting the crude anthraquinone thus produced without separation of impurities to the vapor phase catalytic oxidation in the presence of an oxygen containing gas and of a vapor phase oxidation catalyst damped with an amount of a compound of an alkali forming metal sufficient to bring its activity below the level at which substantial oxidation of anthraquinone takes place.

Signed at Pittsburgh, Pennsylvania, this 13th day of August, 1928.

ALPHONS O. JAEGER.